United States Patent
Kwon

(10) Patent No.: US 8,104,901 B2
(45) Date of Patent: Jan. 31, 2012

(54) IMAGE PROJECTION SYSTEM AND METHOD

(76) Inventor: Sung-Hoon Kwon, Seoul (KR)

(*) Notice: Subject to any disclaimer, the term of this patent is extended or adjusted under 35 U.S.C. 154(b) by 363 days.

(21) Appl. No.: 12/375,936

(22) PCT Filed: Jul. 10, 2007

(86) PCT No.: PCT/KR2007/003335
§ 371 (c)(1),
(2), (4) Date: Jan. 31, 2009

(87) PCT Pub. No.: WO2008/016223
PCT Pub. Date: Feb. 7, 2008

(65) Prior Publication Data
US 2009/0195709 A1 Aug. 6, 2009

(30) Foreign Application Priority Data
Jul. 31, 2006 (KR) .................. 10-2006-0072129

(51) Int. Cl.
G03B 21/14 (2006.01)
G03B 21/00 (2006.01)

(52) U.S. Cl. .......................... 353/84; 353/31

(58) Field of Classification Search .......... 345/87; 353/30, 31, 37, 84, 122; 359/237, 239, 277, 359/292, 298, 316
See application file for complete search history.

(56) References Cited

U.S. PATENT DOCUMENTS

| | | | | |
|---|---|---|---|---|
| 5,602,658 A | * | 2/1997 | Ezra et al. | ............... 349/95 |
| 6,247,037 B1 | * | 6/2001 | O'Callaghan | ............. 708/816 |
| 6,594,090 B2 | * | 7/2003 | Kruschwitz et al. | ......... 359/707 |
| 7,075,562 B2 | | 7/2006 | Ohtaka et al. | |
| 2004/0012667 A1 | | 1/2004 | Ohtaka et al. | |

FOREIGN PATENT DOCUMENTS

| | | |
|---|---|---|
| EP | 0625861 A | 11/1994 |
| JP | 7005420 | 1/1995 |
| JP | 08062911 A | 3/1996 |
| JP | 11344722 A | 12/1999 |
| JP | 2004-102213 | 4/2004 |

* cited by examiner

Primary Examiner — Georgia Y Epps
Assistant Examiner — Renee Naphas
(74) Attorney, Agent, or Firm — Sherr & Vaughn, PLLC

(57) ABSTRACT

Provided are an image projection system and method, the image projection system including: a light source for providing illumination light; an illumination optics for receiving and illuminating the illumination light; a Spatial Light Modulator (SLM) having 2 rows of modulation devices formed to be offset from each other, each of the modulation devices modulating the light illuminated from the illumination optics; a frame scanner for scanning the modulated light from the SLM onto a screen to thereby generate a two-dimensional (2D) image corresponding to one frame on the screen; and a projection optics for projecting and focusing the modulated light transmitted from the frame scanner onto the screen.

3 Claims, 8 Drawing Sheets

LIGHT FIRST MODULATED BY SLM

LIGHT SECOND MODULATED BY SLM

LIGHT THIRD MODULATED BY SLM

IMAGE PROJECTION SYSTEM AND METHOD

The present application claims priority to Korean Patent Application No. 10-2006-0072129 (filed on Jul. 31, 2006) and PCT International Patent Application No. PCT/KR2007/003335 (filed on Jul. 10, 2007) which are hereby incorporated by reference in its entirety.

TECHNICAL FIELD

The present invention relates to an image projection system and method, and more particularly, to a small-sized, low-priced and portable image projection system and method.

BACKGROUND ART

An increase in popularity and processing capability of mobile devices, such as laptop computers, cellular phones, Personal Digital Assistants (PDAs), digital cameras, Moving Picture Experts Group (MPEG) layer 3 (MP3) players, Personal Media Players (PMPs), etc., combined with an increase in high-speed wide area networks, has resulted in a large market for small-sized and low-priced image projection systems. Image projection systems can be used independently or installed in mobile devices. Like a mobile device, an image projection system must be small, low-priced, and have high battery efficiency.

Nowadays, a portable image projection system generally uses a light source, an illumination optics, a Spatial Light Modulator (SLM), and a projection optics. The light source and illumination optics uniformly illuminate the SLM, the SLM modulates the intensity of light pixel by pixel, and the projection optics projects and focuses modulated pixels onto an appropriate surface.

Most projection systems use a white light bulb, and the white light is required to be separated into red, green and blue components, which are the three primary colors, for independent modulation. General performance of recent projection systems has reached an eXtended Graphics Array (XGA) resolution (1024×768 pixels) and 24-bit colors (8 bit, i.e., 256 intensity levels per primary color).

FIG. 1 illustrates a conventional image projection system using a white light source 11, a color wheel 12, an illumination optics 13, a two-dimensional (2D) SLM 14, a projection optics 15, and a screen 16.

A projection system uses 3 SLMs for the three primary colors or a single SLM that is illuminated by the three primary colors in sequence as shown in FIG. 1. While a single-SLM system emits only one of the three primary colors at a time, a 3-SLM system simultaneously emits all the three primary colors and thus is brighter than the single-SLM system. Since an SLM is the most expensive component in a projection system, the 3-SLM system is far more expensive than the single-SLM system. In addition, the 3-SLM system requires an additional optics for accurately combining respective red, green and blue images, thus increasing its complexity and cost.

Recently, some projection systems have begun to use a solid-state light source, such as a light-emitting diode (LED) or a laser diode (LD). The solid-state light source emits a single color, and does not need a color separation optics. In addition, the solid-state light source provides electrical efficiency, high color saturation and a wide color gamut.

Most general SLMs are Liquid Crystal Displays (LCDs), Liquid Crystal On Silicon (LCOS) devices, and Digital Mirror Devices (DMDs), all of which are 2D devices having single modulation devices for respective image pixels. In the case of the XGA resolution, the devices have 768432 (1024× 768) separate modulation devices. Such SLMs have an active image area of 78.6 mm$^2$ at a pitch of 10 μm.

Most SLMs are fabricated on a semiconductor or a glass wafer. Wafer processing cost is independent of the number of devices, i.e., dies that the wafer includes. Thus, the smaller the surface area of an SLM, the more SLM dies can be fabricated on a wafer. Consequently, more SLM dies can be produced, and the unit price of SLMs can be reduced. However, a die size is substantially limited for reasons relating to cutting, handling and packaging. The smallest reasonable die size is about 1 mm and does not exceed 10 cm. This is because, when a problem occurs in packaging and reliability, an aspect ratio becomes an important characteristic. In addition, a small SLM allows a smaller illumination optics and projection optics to be used more simply and inexpensively.

Conventional 2D SLMs have difficulty matching the core technology for a low-priced small projector. It is difficult to miniaturize the 2D SLMs, and the reduction in pixel size leads to a very complicated and high priced production process. For example, the Texas Instrument Company has reduced the pixel size of a DMD but it is still 16 μm$^2$ to 14 μm$^2$ (확인요). An LCOS pixel is generally smaller than a DMD pixel, but is still at least 8 μm$^2$ (확인요). Thus, a conventional SLM is too large and expensive to be incorporated into a low-priced small image projection system. There is a potentially low-priced method of implementing a smaller image projection system using a one-dimensional (1D) SLM, wherein a single row of modulation devices generate a line image, and rapidly scan the line image forward and backward to generate a 2D image.

Such an SLM may have a remarkably small surface area and is inexpensively produced, thus enabling implementation of a smaller and lower-priced projection system.

FIG. 2 illustrates a projection system using a 1D SLM 23 and a separated red, green and blue (RGB) light source 21 according to conventional art. The projection system illustrated in FIG. 2 has the RGB light source 21, an illumination optics 22, the 1D SLM 23, a frame scanner 24, a projection optics 25, and a screen 26. FIG. 3 illustrates time-divided RGB lights of the projection system shown in FIG. 2. Since the SLM 23 of FIG. 2 performs projection using one row, RGB lights are emitted at different times as illustrated in FIG. 3.

In comparison with the 2D SLM 14 of FIG. 1, the 1D SLM 23 has a much smaller size, but still the aspect ratio must be considered. More specifically, an SLM having a 1D architecture may theoretically use a die corresponding to 1×1024 modulation devices, but has no choice but to use a die corresponding to, for example, 50×1024 modulation devices because an actual die has a limited aspect ratio. Needless to say, even when the die corresponding to 50×1024 modulation devices is used, only 1×1024 modulation devices are formed in the SLM having the 1D architecture. This indicates that the 1D SLM 23 does not efficiently use a die.

In addition, the 1D SLM according to conventional art has a disadvantage in that it still has the same width as a 2D SLM. More specifically, assuming that the width of one modulation device is 10 μm, the 1D SLM 23 having 1024 modulation devices according to conventional art has a length of about 10 mm. Furthermore, when the width of the SLM 23 increases, a distance between the illumination optics 22 and the SLM 23 increases in proportion to the increase in width of the SLM 23, and also the total size of a projection system increases. This prevents the projection system from being attached to a portable device, e.g., a cellular phone.

Furthermore, in the 1D SLM 23 according to conventional art, an interval D1 exists between modulation devices, and thus causes several problems. In most cases, the interval D1 between modulation devices is indispensable for many reasons such as a driver circuit, an area required for interconnection with a driver circuit, prevention of physical contact between the modulation devices, maintenance of insulation between the modulation devices, and so on. However, due to the interval D1 between modulation devices, a dark area may be seen between pixels when the screen 26 is observed in close proximity. Furthermore, the width of the 1D SLM 23 increases in proportion to the interval D1. Assuming that the interval between modulation devices corresponds to a half of a width D2 of the modulation devices, the SLM 23 in which the interval D1 exists between modulation devices has a 50% width excess in comparison with a case in which there is no interval between the modulation devices. This increases the production cost of the SLM and the size of an image projection system.

DISCLOSURE

Technical Problem

The present invention is directed to an image projection system and method capable of efficiently using the die of a Spatial Light Modulator (SLM).

The present invention is also directed to an image projection system and method capable of reducing the width of an SLM.

The present invention is also directed to an image projection system and method for decreasing a distance between an illumination optics and an SLM and thereby reducing the size of the system.

The present invention is also directed to an image projection system and method for increasing the horizontal resolution of the image projection system without increasing the width of an SLM.

The present invention is also directed to an image projection system and method for generating an image in which shade is not generated.

Technical Solution

A first aspect of the present invention provides an image projection system, comprising: a light source for providing illumination light; an illumination optics for receiving and illuminating the illumination light; a Spatial Light Modulator (SLM) including 2 rows of modulation devices formed to be offset from each other, each of the modulation devices modulating the light illuminated from the illumination optics; a frame scanner for scanning the modulated light from the SLM onto a screen to thereby generate a two-dimensional (2D) image corresponding to one frame on the screen; and a projection optics for projecting and focusing the modulated light transmitted from the frame scanner onto the screen.

A second aspect of the present invention provides an image projection system, comprising: a light source for providing illumination light; an illumination optics for receiving and illuminating the illumination light; a Spatial Light Modulator (SLM) including 2 rows of modulation devices formed to be offset from each other, each of the modulation devices modulating the light illuminated from the illumination optics; and a projection optics for projecting and focusing the light from the SLM onto a screen, wherein the SLM scans the modulated light onto the screen and thus generates a two-dimensional (2D) image corresponding to one frame on the screen.

A third aspect of the present invention provides an image projection system, comprising: a light source for providing illumination light; an illumination optics for receiving the illumination light and simultaneously illuminating three primary colors of red, green and blue included in the received illumination light to different zones; a Spatial Light Modulator (SLM) comprising into three zones respectively illuminated by the red, green and blue lights from the illumination optics, each of the three zones including 2 rows of modulation devices formed to be offset from each other and each of the modulation devices modulating the light illuminated from the illumination optics; a frame scanner for scanning the modulated light from the SLM onto a screen to thereby generate a two-dimensional (2D) image corresponding to one frame on the screen; and a projection optics for projecting and focusing the modulated light transmitted from the frame scanner onto the screen.

A fourth aspect of the present invention provides an image projection system, comprising: a light source for providing illumination light; an illumination optics for receiving the illumination light and simultaneously illuminating three primary colors of red, green and blue included in the received illumination light to different zones; a Spatial Light Modulator (SLM) comprising three zones respectively illuminated by the red, green and blue lights from the illumination optics, each of the three zones having at least 2 rows of modulation devices formed to be offset from each other and each of the modulation devices modulating the light illuminated from the illumination optics; and a projection optics for projecting and focusing the light from the SLM onto a screen, wherein the SLM scans the modulated light onto the screen and thus generates a two-dimensional (2D) image corresponding to one frame on the screen.

A fifth aspect of the present invention provides an SLM for image projection, comprising a plurality of rows of modulation devices formed to be offset from each other, wherein the rows of modulation devices each modulate illuminated light.

A sixth aspect of the present invention provides an SLM for image projection, comprising a plurality of zones illuminated by different colors, wherein each of the zones comprises a plurality of rows of modulation devices formed to be offset from each other, and the rows of modulation devices each modulate illuminated light.

A seventh aspect of the present invention provides an image projection method, comprising the steps of: (a) illuminating light to a Spatial Light Modulator (SLM) including 2 rows of modulation devices formed to be offset from each other; (b) controlling the modulation devices for modulating the illuminated light; and (c) scanning the modulated light onto a screen to thereby generate a two-dimensional (2D) image corresponding to one frame on the screen.

An eighth aspect of the present invention provides an image projection method, comprising the steps of: (a) illuminating light of a plurality of colors to a Spatial Light Modulator (SLM) including a plurality of zones each having 2 rows of modulation devices formed to be offset from each other, wherein the plurality of colors are respectively projected onto the plurality of zones; (b) controlling the modulation devices for modulating the illuminated light; and (c) scanning the modulated light onto a screen to thereby generate a two-dimensional (2D) image corresponding to one frame on the screen.

Advantageous Effects

An image projection system and method according to the present invention can efficiently use a die. More specifically, a Spatial Light Modulator (SLM) having a one-dimensional (1D) architecture may theoretically use a die corresponding to 1×1024 modulation devices, but has no choice but to use a die corresponding to, for example, 50×1024 modulation devices (in case where an aspect ratio is 1:20) because an actual die has a limited aspect ratio. Needless to say, even when the die corresponding to 50×1024 modulation devices is used, only 1×1024 modulation devices are formed in the SLM having the 1D architecture. However, an image projection architecture according to the present invention forms, for example, 2×512 modulation devices in one die, and thus only a 25×512 die can be used. Therefore, in comparison with conventional art, it is possible to efficiently use a die.

In addition, the projection system and method according to the present invention can reduce the width of an SLM while maintaining the same resolution of a screen. In other words, the projection system and method according to the present invention can increase the horizontal resolution of a screen while maintaining the same width of an SLM.

Additionally, the projection system and method according to the present invention can reduce the size of the system by decreasing a distance between an illumination optics and an SLM.

Further, the projection system and method according to the present invention do not generate shade between pixels of a screen.

Furthermore, the projection system and method according to the present invention, as shown in FIGS. 6, 7, and 8 (c), simultaneously emit the three primary colors and thereby obtain equivalent brightness efficiency to that which is available in a conventional 3-SLM system.

Still further, the projection system and method according to the present invention, as shown in FIG. 8 (c), can use a plurality of devices to modulate respective colors for each image pixel, and the respective modulation devices can operate at a many times lower rate.

Figure 1:
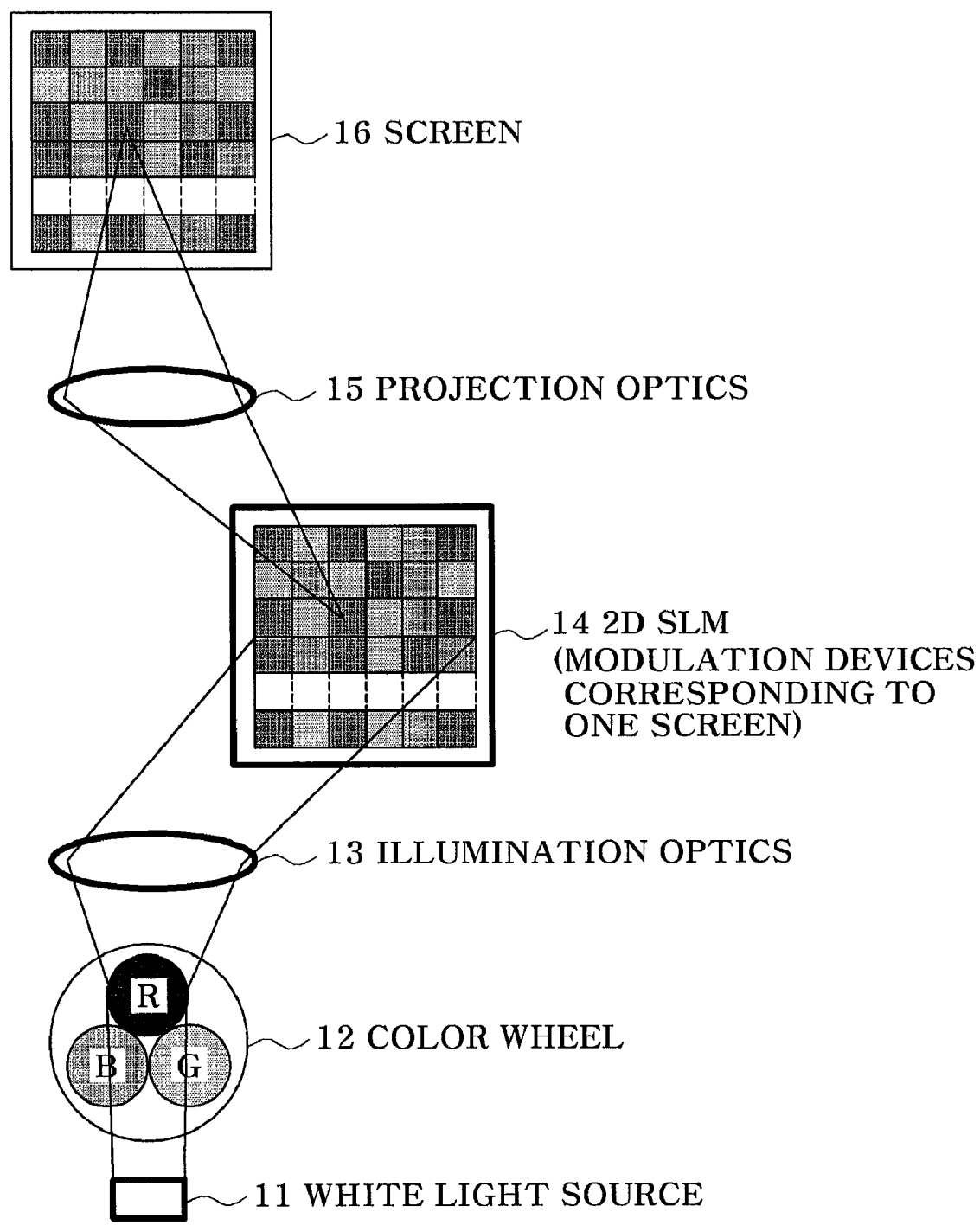
FIG. 1 illustrates a conventional image projection system using a white light source 11, a color wheel 12, an illumination optics 13, a two-dimensional (2D) Spatial Light Modulator (SLM) 14, a projection optics 15, and a screen 16.

DESCRIPTION OF MAJOR SYMBOLS IN THE ABOVE FIGURES 11, 21, 31, 31': Light source
12, 38: Color wheel
13, 22, 32, 32': Illumination optics
14, 23, 33, 33', 33": SLM
15, 25, 35: Projection optics
16, 26, 36: Screen
24, 34: Frame scanner
37: Coupling optics

MODES FOR INVENTION

Hereinafter, exemplary embodiments of the present invention will be described in detail. However, the present invention is not limited to the exemplary embodiments disclosed below, but can be implemented in various ways. Therefore, the present exemplary embodiments are provided for complete disclosure of the present invention and to fully inform the scope of the present invention to those ordinarily skilled in the art.

Figure 4:
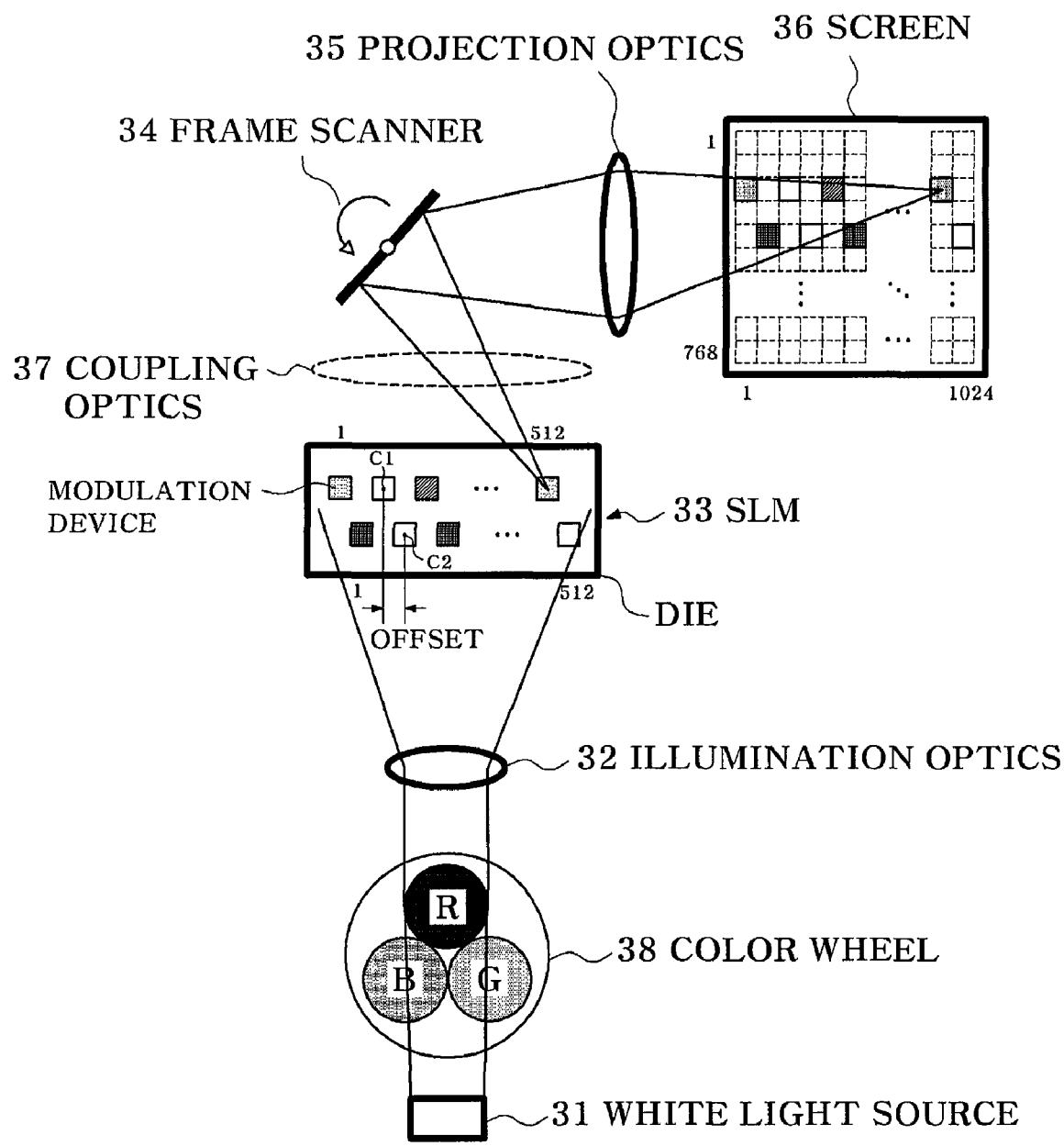
FIG. 4 illustrates an image projection system according to a first exemplary embodiment of the present invention.

FIG. 4 illustrates an image projection system according to a first exemplary embodiment of the present invention. Referring to FIG. 4, the projection system comprises a light source 31, an illumination optics 32, a Spatial Light Modulator (SLM) 33, a frame scanner 34, a projection optics 35, and a screen 36. The projection system may further comprise a coupling optics 37 and a color wheel 38.

The light source 31 performs a function of providing illumination light. The light source illustrated in FIG. 4 is a white light source. When the image projection system includes the color wheel 38, a color image is projected to the screen 36. Otherwise, a monochrome image is projected onto the screen 36.

The illumination optics 32 performs a function of receiving the illumination light from the light source 31 and illuminating the illumination light to the SLM 33.

The SLM 33 has 2 rows of modulation devices formed to be offset from each other, and each of the modulation devices modulates the light illuminated from the illumination optics 32. Since the 2 rows of modulation devices are formed to be offset from each other, a predetermined offset exists between a center C1 of a modulation device in a first row and a center C2 of a modulation device in a second row. When an image generated on the screen 36 has 1024 pixels in one row, 512 modulation devices may be sufficient for each of the first and second rows in the SLM 33, which is fabricated using one die. The SLM 33 performs a function of modulating and outputting the light illuminated from the illumination optics 32. In FIG. 4, there is an interval corresponding to a modulation device of the first row between the first and second rows. However, as long as no problem arises in an image generated on the screen 36, the interval between the first and second rows may be larger or smaller than the interval corresponding to a modulation device of the first row. For example, the interval between the first and second rows may be the same as an interval corresponding to a modulation device of the second row. Although not shown in FIG. 4, driver circuits for driving the modulation devices of the first and second rows may be formed above the modulation devices of the first row and below the modulation devices of the second row, respectively. Through such driver circuits, data may be simultaneously loaded into the modulation devices. In FIG. 4, an interval between modulation devices of each row is the same as the width of the modulation devices, but may be larger or smaller than the width of the modulation devices. The illumination light from the illumination optics 32 may be simultaneously illuminated to all the modulation devices included in the SLM 33.

The frame scanner 34 scans modulated light from the SLM 33 onto the screen 36 through the projection optics 35, thereby generating a two-dimensional (2D) image corresponding to one frame on the screen 36. The frame scanner 34 may control the light incident on the screen 36 to be shifted by 1 row. More specifically, the frame scanner 34 may illuminate light modulated by the first row of the SLM 33 onto odd-numbered pixels of a third row in the screen 36, and illuminate light modulated by the second row of the SLM 33 onto even-numbered pixels of a fifth row in the screen 36. Subsequently, the frame scanner 34 may illuminate light modulated by the first row of the SLM 33 onto odd-numbered pixels of a fourth row in the screen 36 and illuminate light modulated by the second row of the SLM 33 onto even-numbered pixels of a sixth row in the screen 36. Subsequently, the frame scanner 34 may illuminate light modulated by the first row of the SLM 33 onto odd-numbered pixels of a fifth row in the screen 36, and illuminate light modulated by the second row of the SLM 33 onto even-numbered pixels of a seventh row in the screen 36. When the frame scanner 34 operates as described above, the odd-numbered pixels of the fifth row are illuminated by the light modulated by the modulation devices of the first row in the SLM 33, and the even-numbered pixels are illuminated by the light modulated by the modulation devices of the second row in the SLM 33.

The projection optics 35 enlarges, focuses and projects modulated light transmitted from the frame scanner 34 onto the screen 36. The image projection system may further comprise the coupling optics 37 disposed between the SLM 33 and the frame scanner 34.

Figure 5:
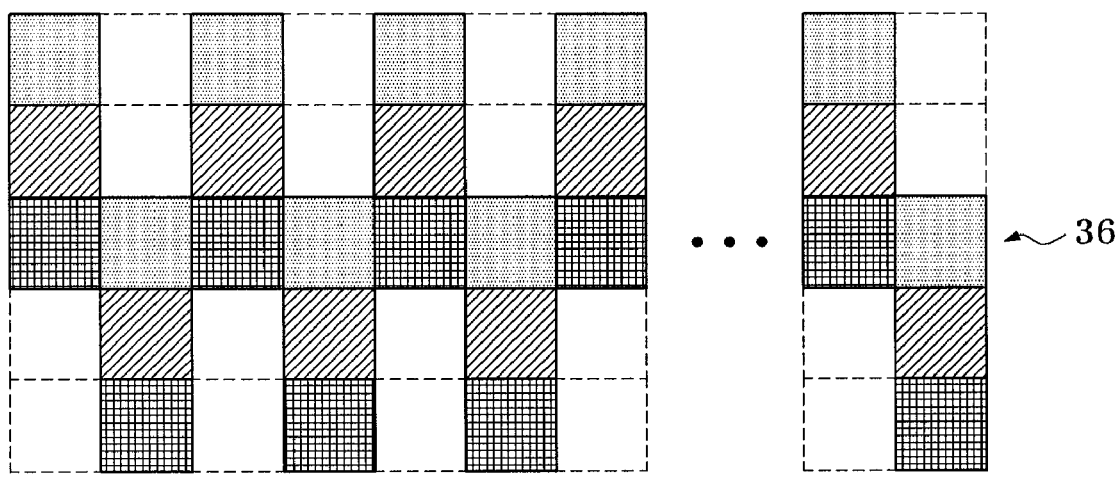
FIG. 5 illustrates how the image projection system according to the first exemplary embodiment of the present invention projects modulated light to one row of pixels.
Figure 5:
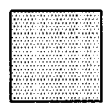
Figure 5:
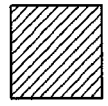
Figure 5:
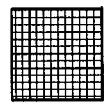

FIG. 5 illustrates how the image projection system according to the first exemplary embodiment of the present invention projects modulated light to one row of pixels. Referring to FIG. 5, at a specific point in time, the first row of the SLM 33 contributes to pixels corresponding to a half of a first row in the screen 36, i.e., odd-numbered pixels, and the second row of the SLM 33 contributes to pixels corresponding to a half of the third row in the screen 36, i.e., even-numbered pixels. However, when the frame scanner 34 shifts by 3 rows, the first row of the SLM 33 contributes to the odd-numbered pixels of the third row in the screen 36, and the second row of the SLM 33 contributes to even-numbered pixels of the third row in the screen 36. In the same way, when one frame is scanned, the first row of the SLM 33 contributes to odd-numbered pixels of all rows in the screen 36, and the second row of the SLM 33 contributes to even-numbered pixels of all the rows in the screen 36. Since the image projection system according to an exemplary embodiment of the present invention operates as described above, it is possible to form a row having 1024 pixels in the screen 36 using the SLM 33 including 512 modulation devices in each row.

Figure 6:
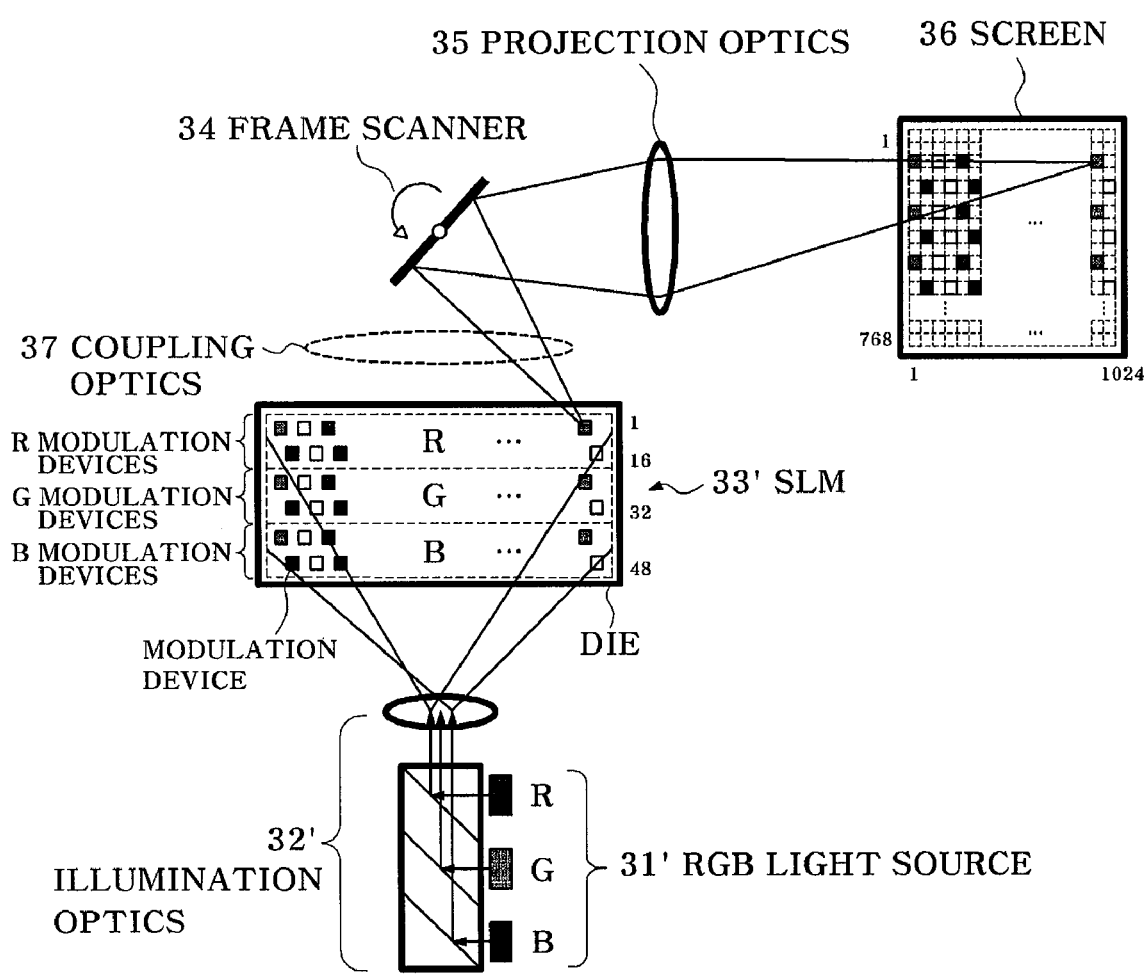
FIG. 6 illustrates an image projection system according to a second exemplary embodiment of the present invention.

FIG. 6 illustrates an image projection system according to a second exemplary embodiment of the present invention. Unlike FIG. 5, the image projection system of FIG. 6 can simultaneously illuminate red, green and blue (RGB) lights onto a screen without using a color wheel. Referring to FIG. 6, the projection system comprises a light source 31', an illumination optics 32', an SLM 33', a frame scanner 34, a projection optics 35 and a screen 36, and may further comprise a coupling optics 37.

Figure 2:
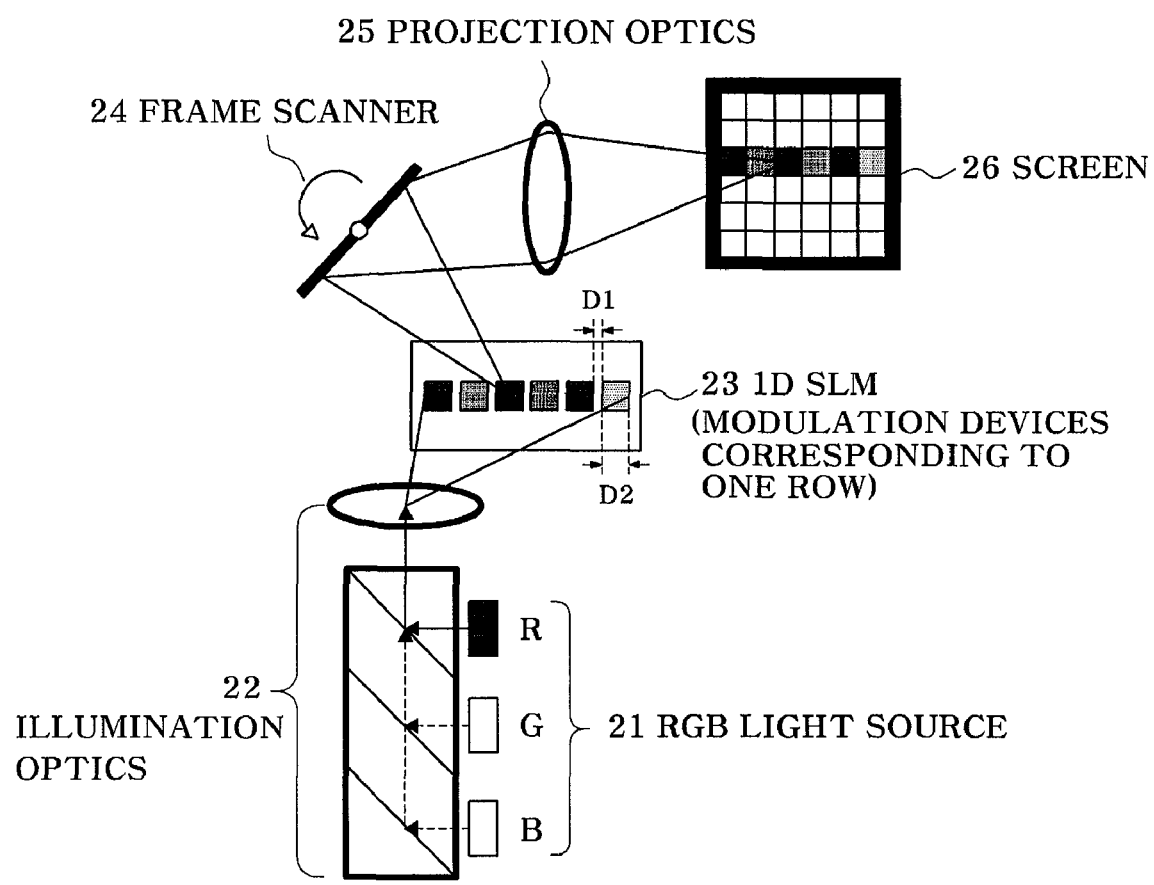
FIG. 2 illustrates a projection system using a one-dimensional (1D) SLM 23 and a separated red, green and blue (RGB) light source 21 according to conventional art.
Figure 3:
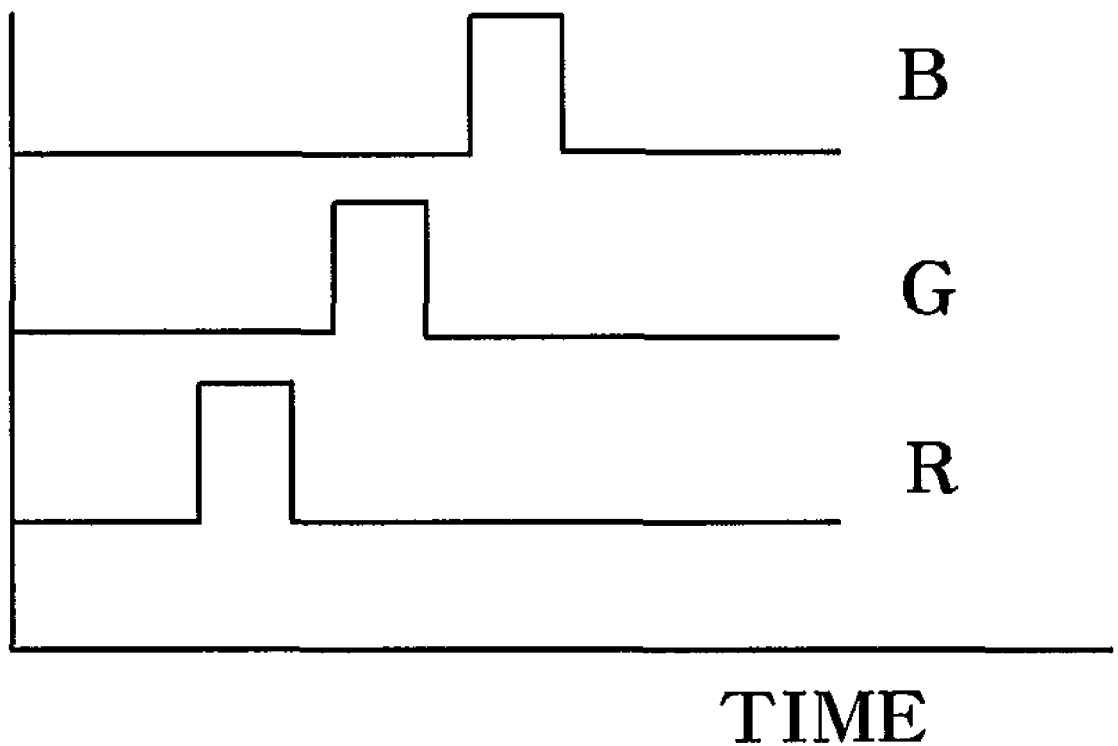
FIG. 3 illustrates time-divided RGB lights of the projection system shown in FIG. 2.

The light source 31' performs a function of providing RGB illumination light. The illustrated light source uses one Light Emitting Diode (LED) for each of, for example, the three primary colors. Unlike the time-multiplexed RGB light source 21 of FIGS. 2 and 4, the light source 31' of FIG. 6 may simultaneously emit RGB lights.

The illumination optics 32' performs a function of receiving the illumination light from the light source 31' and simultaneously projects the three primary colors of red, green and blue included in the received illumination light onto different zones of the SLM 33'. More specifically, the illumination optics 32' projects red light to red modulation devices of the SLM 33', green light to green modulation devices of the SLM 33' and blue light to blue modulation devices of the SLM 33'.

The SLM 33' is comprising three zones illuminated by the red, green and blue lights from the illumination optics 32'. Each of the three zones has 2 rows of modulation devices formed to be offset from each other, and each of the modulation devices modulates the light illuminated from the illumination optics 32'. The SLM 33' is fabricated using one die. The illumination light from the illumination optics 32' may be simultaneously illuminated to all the modulation devices included in the SLM 33'.

Other components are similar to those of the image projection system shown in FIG. 4, and thus detailed descriptions thereof will be omitted.

The image projection system shown in FIG. 6 has an advantage in that it can simultaneously illuminate modulated red, green and blue lights onto the screen 36 without using a color wheel, in comparison with the image projection system shown in FIG. 4.

Figure 7:
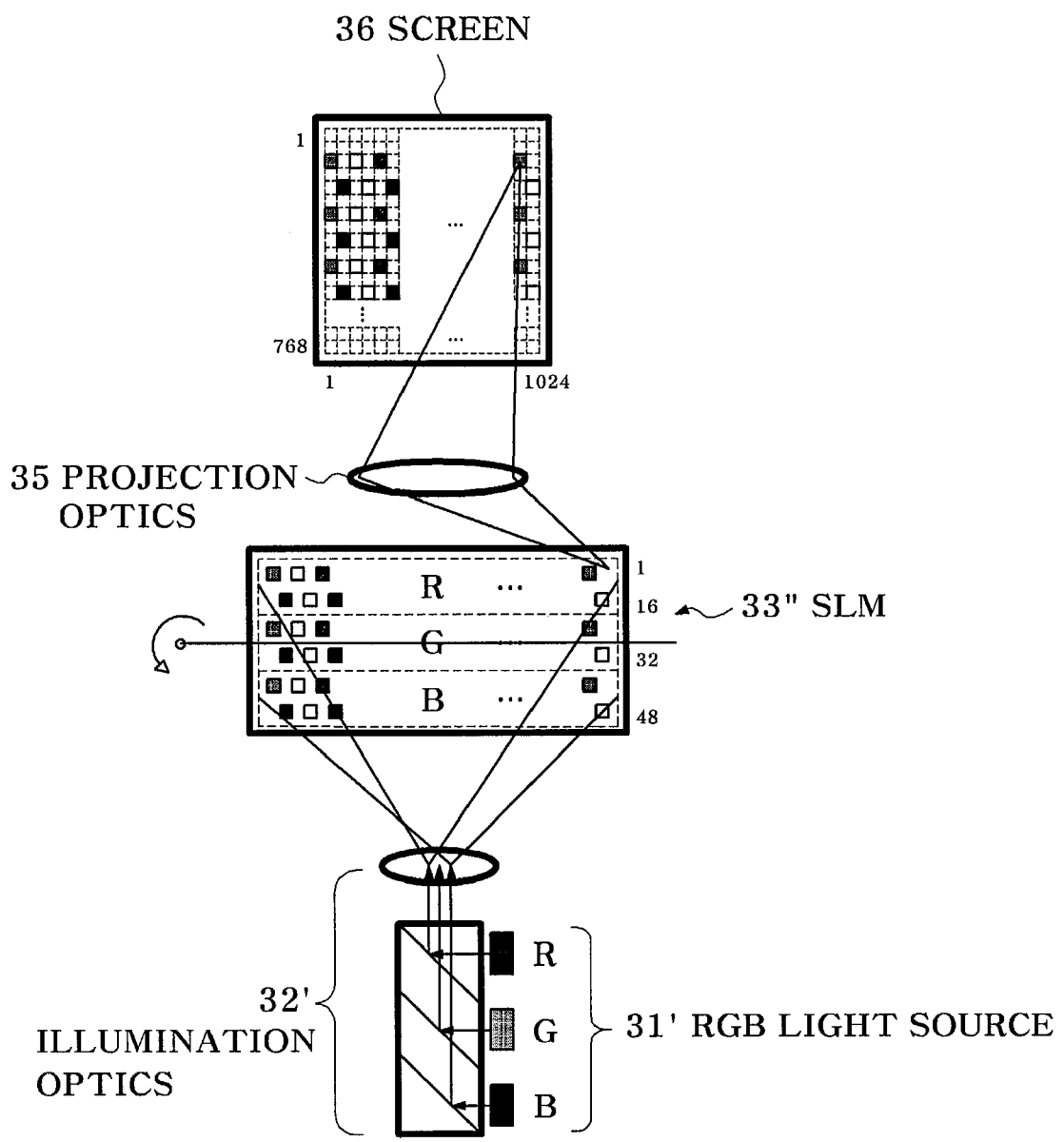
FIG. 7 illustrates an image projection system according to a third exemplary embodiment of the present invention.

FIG. 7 illustrates an image projection system according to a third exemplary embodiment of the present invention. Referring to FIG. 7, the image projection system comprises a light source 31', an illumination optics 32', an SLM 33'', a projection optics 35, and a screen 36.

Unlike the projection system of FIG. 6, the projection system of FIG. 7 does not have the frame scanner 34, but instead oscillates the SLM 33' itself. In other words, the SLM 33' performs the function of the frame scanner 34 of FIG. 6 as well as its own function.

Other components of FIG. 7 are the same as those of FIG. 6, and thus detailed descriptions thereof will be omitted. In FIG. 7, an RGB light source may be used as the light source 31' as illustrated, or a white light source may be used as the light source 31' in a different manner from that shown in the drawing. When a white light source is used, the image projection system must additionally have the color wheel of FIG. 4 to display colors.

Figure 8:
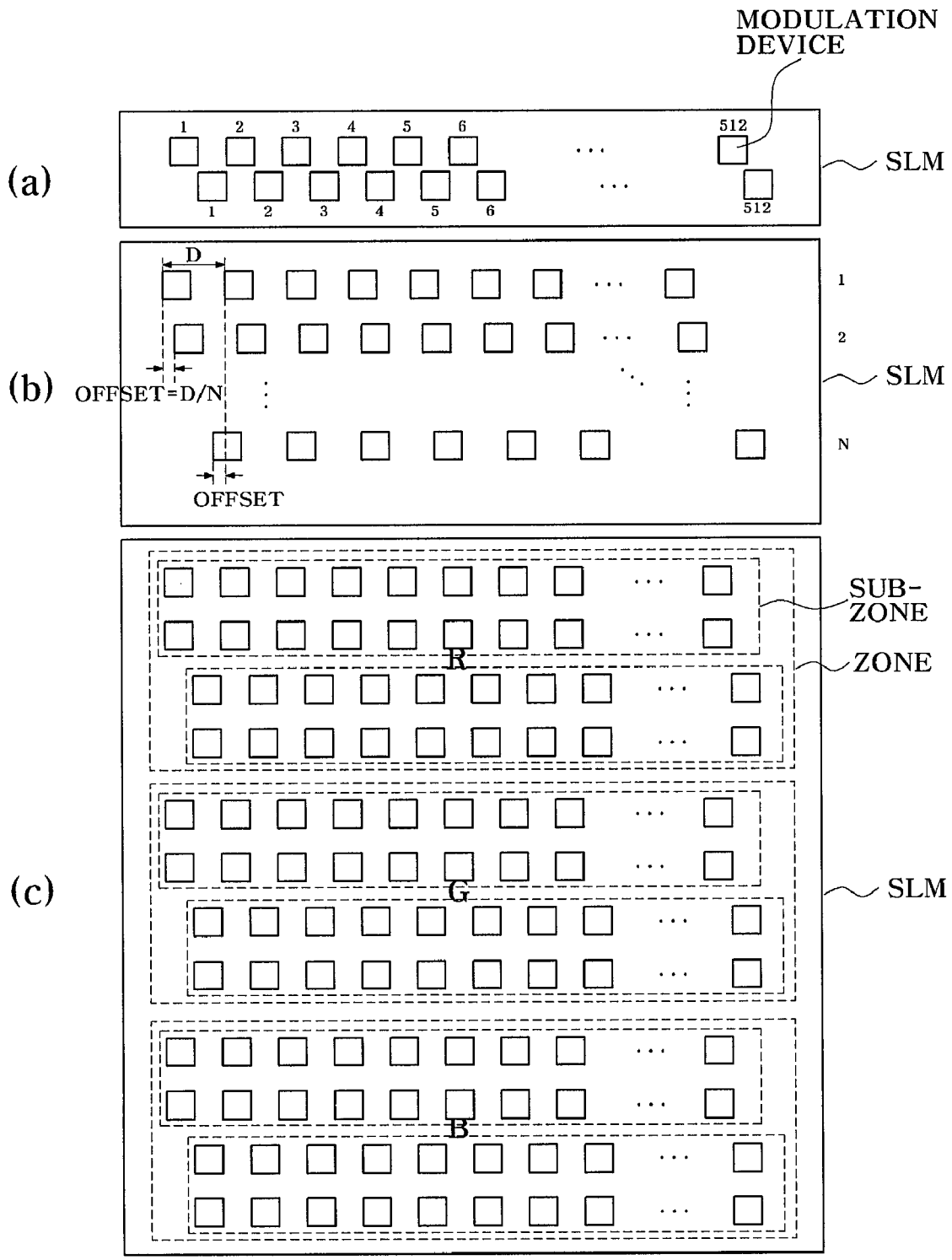
FIG. 8 illustrates several arrangements of modulation devices of an SLM that can be used in FIG. 4, 6 or 7.

FIG. 8 illustrates several arrangements of modulation devices of an SLM that can be used in FIG. 4, 6 or 7.

Referring to FIG. 8, (a) illustrates an SLM in which an interval between modulation devices is smaller than the width of the modulation devices. In this case, since odd-numbered pixels of a predetermined row in a screen partially overlap even-numbered pixels, performance may deteriorate in comparison with the exemplary embodiment of FIG. 4. Nevertheless, the SLM of (a) uses 512 modulation devices in a row to form 1024 pixels in the screen and thus has improved performance in comparison with a conventional one-dimensional (1D) SLM that forms 512 pixels in the screen when 512 modulation devices are used in one row. Since a die has a limited aspect ratio, the conventional 1D SLM (that includes 1 row of pixels, the row including 512 pixels) and the SLM shown in (a) (including 2 rows of pixels, the 2 rows each including 512 pixels) use a same-sized die and thus require the same production cost.

Referring to FIG. 8 again, (b) illustrates an SLM including N rows of modulation devices formed to be offset from each other. When a distance between the modulation devices in a row is denoted by D, modulation devices of a first row and those of a second row have an offset of D/N.

Referring to FIG. 8 once more, (c) illustrates an SLM comprising three zones illuminated by red, green and blue lights. Each of the three zones is divided again into a plurality of sub-zones, and each sub-zone includes a plurality of rows. The rows included in each sub-zone are formed in line with each other (i.e., not to be offset from each other), and rows included in different sub-zones are formed to be offset from each other. For example, an SLM in which each zone includes 2 sub-zones, and each sub-zone includes 2 rows, is illustrated in FIG. 8 (c). In addition, in FIG. 8 (c), First and second rows constitute a first sub-zone, and third and fourth rows constitute a second sub-zone. However, it does not matter that the first and third rows constitute the first sub-zone, and the second and fourth rows constitute the second sub-zone. Since one sub-zone includes a plurality of rows as described above, one pixel of a screen is irradiated by light modulated by several modulation devices.

While the invention has been shown and described with reference to certain exemplary embodiments thereof, it will be understood by those skilled in the art that various changes in form and detail may be made therein without departing from the spirit and scope of the invention as defined by the appended claims. Those skilled in the art will understand that the concept of the present invention can be applied to: an image resolution standard, including Video Graphics Array (VGA), Super VGA (SVGA), eXtended Graphics Array (XGA), Super XGA (SXGA), etc.; an SLM, including a Liquid Crystal Display (LCD), a Liquid Crystal on Silicon (LCOS) device, a Digital Mirror Device (DMD), a Grating Light Valve (GLV), etc.; a light source, including a white light bulb, an LED, a laser diode (LD), a vertical cavity surface emitting laser (VCSEL), an edge-emitting light-emitting diode (EELED), etc.; a frame scanner, including a microelectromechanical systems (MEMS) mirror scanner, a polygon mirror scanner, a galvanic mirror scanner, etc.; an optics, including a refractive optics, a reflective optics, a diffraction optics, a lens optics, a mirror optics, a prism optics, a dichroic mirror optics, a polarization optics, a coating optics, an integrated optics, a micro-optics, a round optics, a cylindrical optics, etc.; a color gamut, including RGB, cyan-magenta-yellow-black (CMYK), etc.; and so on. The present invention can be applied to optical communication, biomedical imaging and optical lithography as well as a display.

Likewise, those skilled in the art will understand the following:

At least 2 rows of modulation devices can be used in an SLM.

At least 1 column of modulation devices can be used for each column of image pixels.

An image can be scanned in one of long and short directions.

A modulation device can be a perfect square, a rectangle, or an arbitrary shape.

A column of modulation devices can be a perfect square, a rectangle, or an arbitrary shape.

A difference in projection enlargement magnification between x and y directions can be implemented by a projection optics or a coupling optics.

A scanning method can be a progressive scan or an interlaced scan.

A laser light source can be single mode or multi-mode.

The invention claimed is:

1. An image projection system, comprising:
a light source for providing light;
illumination optics for re-directing the light from the light source;
a spatial light modulator including two rows of modulation devices formed to be offset from each other, each of the modulation devices modulating light re-directed from the illumination optics;
a frame scanner for scanning the modulated light from the spatial light modulator onto a screen to thereby generate a two-dimensional image corresponding to a single frame on the screen; and
projection optics for projecting and focusing the modulated light transmitted from the frame scanner onto the screen,
wherein a first plurality of pixels in a first row on the screen are illuminated by light modulated by a first row of modulation devices among the two rows of modulation devices, and a second plurality of pixels in the first row on the screen are illuminated by light modulated by a second row of modulation devices among the two rows of modulation devices.

2. The image projection system of claim 1, wherein the spatial light modulator is formed on a single die.

3. An image projection method, comprising the steps of:
(a) illuminating light on a spatial light modulator including two rows of modulation devices formed to be offset from each other;
(b) controlling the modulation devices for modulating the illuminated light; and
(c) scanning the modulated light onto a screen to thereby generate a two-dimensional image corresponding to a single frame on the screen,
wherein in step (c), a first plurality of pixels in a first row on the screen are illuminated by light modulated by a first row of modulation devices among the two rows of modulation devices, and a second plurality of pixels in the first row on the screen are illuminated by light modulated by a second row of modulation devices among the two rows of modulation devices.

* * * * *